United States Patent
Dürr

(10) Patent No.: US 12,099,129 B2
(45) Date of Patent: Sep. 24, 2024

(54) METHOD AND APPARATUS FOR DETERMINING A POSITION OF AN UNMANNED VEHICLE, AND UNMANNED AERIAL VEHICLE

(71) Applicant: Sony Group Corporation, Tokyo (JP)

(72) Inventor: Peter Dürr, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 292 days.

(21) Appl. No.: 17/624,581

(22) PCT Filed: May 15, 2020

(86) PCT No.: PCT/EP2020/063604
§ 371 (c)(1),
(2) Date: Jan. 4, 2022

(87) PCT Pub. No.: WO2021/013400
PCT Pub. Date: Jan. 28, 2021

(65) Prior Publication Data
US 2022/0252737 A1    Aug. 11, 2022

(30) Foreign Application Priority Data

Jul. 22, 2019 (EP) ..................................... 19187607

(51) Int. Cl.
| | |
|---|---|
| *G01S 19/22* | (2010.01) |
| *B64C 39/02* | (2023.01) |
| *G01S 19/42* | (2010.01) |
| *G01S 19/47* | (2010.01) |

(Continued)

(52) U.S. Cl.
CPC ............ *G01S 19/47* (2013.01); *B64C 39/024* (2013.01); *G01S 19/22* (2013.01); *G01S 19/428* (2013.01); *B64U 10/13* (2023.01); *B64U 30/20* (2023.01)

(58) Field of Classification Search
CPC ............................... G01S 19/22; G01S 19/428
See application file for complete search history.

(56) References Cited

U.S. PATENT DOCUMENTS

| | | | | |
|---|---|---|---|---|
| 10,495,762 | B2 * | 12/2019 | Niesen | ............... G01C 21/3623 |
| 11,169,274 | B2 * | 11/2021 | Viswanathan | ........... G01S 19/42 |
| 11,340,354 | B2 * | 5/2022 | Lin | ........................ G01S 13/867 |

(Continued)

FOREIGN PATENT DOCUMENTS

| | | |
|---|---|---|
| JP | 2010534849 A | 11/2010 |
| WO | WO-2019135364 A | 7/2019 |

OTHER PUBLICATIONS

International Search Report and Written Opinion mailed on Aug. 11, 2020, received for PCT Application PCT/EP2020/063604, Filed on May 15, 2020, 10 pages.

*Primary Examiner* — Cassi J Galt
(74) *Attorney, Agent, or Firm* — XSENSUS LLP

(57) ABSTRACT

A method for determining a position of an Unmanned Vehicle (UV) is provided. The method includes receiving positioning signals from a plurality of satellites of a global navigation satellite system. Further, the method includes estimating the position of the UV based on (i) a three-dimensional model of the UV's environment and (ii) possible signal paths for each of the positioning signals. At least part of the possible signal paths include reflections of the positioning signals by one or more objects in the UV's environment.

14 Claims, 5 Drawing Sheets

(51) Int. Cl.
*B64U 10/13* (2023.01)
*B64U 30/20* (2023.01)

(56) References Cited

U.S. PATENT DOCUMENTS

| | | |
|---|---|---|
| 2008/0033645 A1* | 2/2008 | Levinson ............... G01S 19/49 |
| | | 701/469 |
| 2010/0176992 A1 | 7/2010 | T'siobbel |
| 2016/0146945 A1 | 5/2016 | Kamijo et al. |
| 2017/0299727 A1 | 10/2017 | Irish et al. |
| 2018/0038694 A1 | 2/2018 | Bruemmer et al. |

* cited by examiner

METHOD AND APPARATUS FOR DETERMINING A POSITION OF AN UNMANNED VEHICLE, AND UNMANNED AERIAL VEHICLE

CROSS-REFERENCE TO RELATED APPLICATIONS

The present application is based on PCT filing PCT/EP2020/063604, filed May 15, 2020, which claims priority to EP 19187607.7, filed Jul. 22, 2019, the entire contents of each are incorporated herein by reference.

FIELD

The present disclosure relates to position determination for an Unmanned Vehicle (UV). In particular, examples relate to a method and an apparatus for determining a position of a UV. Further examples relate to an Unmanned Aerial Vehicle (UAV).

BACKGROUND

Global Navigation Satellite Systems (GNSSs) such as the Global Positioning System (GPS) are often used to provide absolute, globally referenced position information for autonomous vehicles such as drones, autonomous cars, etc. The radio signals such systems rely on, however, may be blocked or reflected by large structures in the environment of the robot, leading to a decrease in the quality, or even total disruption, of the position estimate.

Hence, there may be a demand for improved position determination.

SUMMARY

This demand is met by apparatuses and methods in accordance with the independent claims. Advantageous embodiments are addressed by the dependent claims.

According to a first aspect, the present disclosure provides a method for determining a position of a UV. The method comprises receiving positioning signals from a plurality of satellites of a GNSS. Further, the method comprises estimating the position of the UV based on (i) a three-dimensional model of the UV's environment and (ii) possible signal paths for each of the positioning signals. At least part of the possible signal paths include reflections of the positioning signals by one or more objects in the UV's environment.

According to a second aspect, the present disclosure provides a non-transitory machine readable medium having stored thereon a program having a program code for controlling a UV to perform the method for determining a positon of the UV as described herein, when the program is executed on a processor or a programmable hardware of the UV.

According to a third aspect, the present disclosure provides an apparatus for determining a positon of a UV. The apparatus comprises a receiver circuit configured to receive positioning signals from a plurality of satellites of a GNSS. Further, the apparatus comprises a processing circuit configured to estimate the position of the UV based on (i) a three-dimensional model of the UV's environment and (ii) possible signal paths for each of the positioning signals. At least part of the possible signal paths for each of the positioning signals include reflections of the positioning signals by one or more objects in the UV's environment.

According to a fourth aspect, the present disclosure provides an UAV comprising an apparatus for determining a positon of the UAV as described herein.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
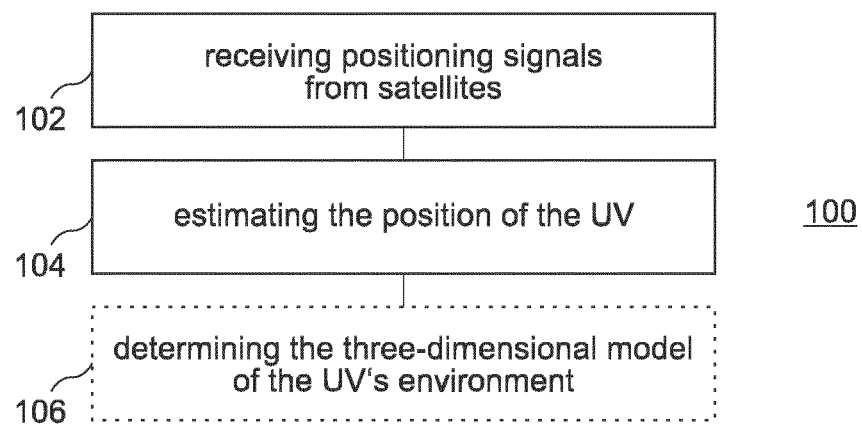
FIG. 1 illustrates a flowchart of an example of a method for determining a positon of a UV.

FIG. 1 illustrates a flowchart of a method 100 for a UV for determining a position of the UV. For reasons of simplicity, the proposed technique will be described in the following mainly with reference to UAVs. However, it is to be noted that the present technique is not limited to UAVs and that it may be used as well for other unmanned vehicles (uncrewed vehicles) such as Unmanned Ground Vehicles (UGVs).

Figure 2:
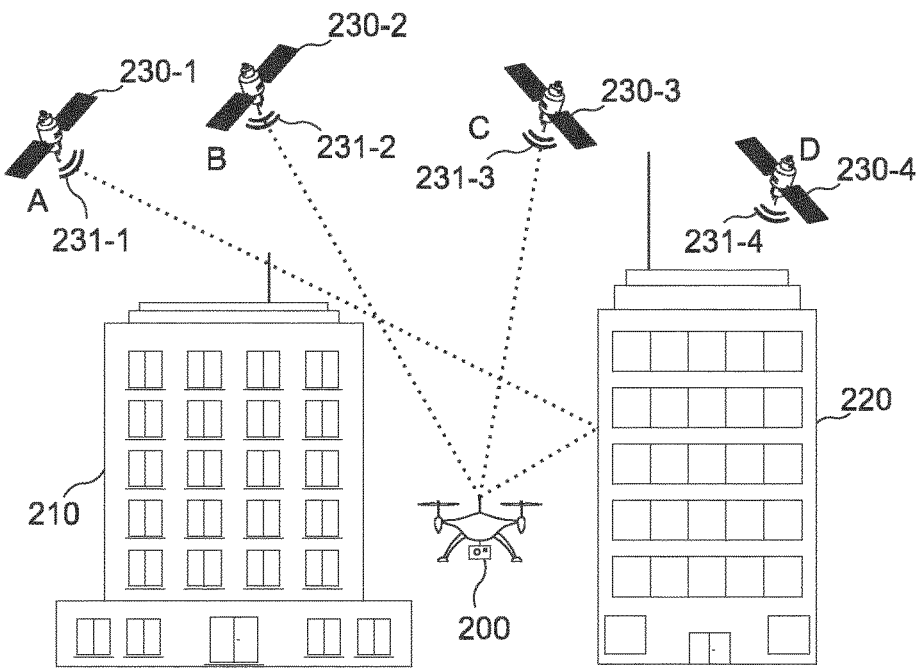
FIG. 2 illustrates an example of an UAV in an environment.

An exemplary scenery comprising an UAV 200 is illustrated in FIG. 2. As can be seen from FIG. 2, the UAV 200 is positioned between two multilevel buildings 210 and 220. Further illustrated are four satellites 230-1, . . . , 230-4 of a GNSS such as, e.g., GPS, GLObalnaja NAwigazionnaja Sputnikowaja Sistema (GLONASS), Galileo or Beidou. Each of the four satellites 230-1, . . . , 230-4 provides one or more positioning signals that allow geo-spatial positioning for the UAV 200. In particular, the UAV 200 may accurately measure the time it takes for a positioning signal (e.g. a radio frequency signal) to travel from the satellite to the receiver of the UAV 200 (and further quantities such as Doppler shift etc.).

As can be seen from FIG. 2, the geometries of the buildings 210 and 220 in the UAV 200's environment (surrounding area) affect the propagation of the positioning signals. For example, the positioning signals of the four satellites 230-1, . . . , 230-4 may be blocked or reflected by objects in the UAV 200's environment such that the UAV 200 cannot receive some of the positioning signals or can only receive reflected positioning signals. In the example of FIG. 2, the positioning signal 231-1 of the satellite 230-1 is reflected by the building 220 such that there is no line-of-sight propagation of the positioning signal 231-1 to the UAV 200. The positioning signal 231-4 of the satellite 230-4 is completely blocked by the building 220 such that the UAV 200 cannot receive the positioning signal 231-4. Only the positioning signals 231-2 and 231-3 of the satellites 230-2 and 230-3 are not affected by the UAV 200's environment such that a line-of-sight propagation of the positioning signal 231-1 to the UAV 200 takes place.

If the positioning signal of one of the satellites 230-1, . . . , 230-4 is blocked, the UAV 200 cannot use it for position determination. If the positioning signal of one of the satellites 230-1, . . . , 230-4 is reflected, treating the positioning signal like a not-reflected signal (i.e. assuming a line-of-sight propagation) leads to wrong position estimates since the distance to the satellite is estimated wrongly.

It is to be noted that the buildings 210 and 220 illustrated in FIG. 2 are merely examples for objects in the UAV 200's environment. Any large natural or man-made object (structure) between a satellite of the GNSS and the UAV 200 may block the satellite's positioning signal entirely or reflect it. For example, such objects may be tall building in cities, large rocks in mountain areas, valleys, dams, etc.

Method 100 may allow to more accurately determine the position of a UV such as the UAV 200 also in the presence of objects in the UV's environment. Referring back to FIG. 1, method 100 comprises receiving 102 positioning signals from a plurality of satellites of a GNSS (e.g. as illustrated in FIG. 2). Further, method 100 comprises estimating (determining) 104 the position of the UV based on (i) a three-dimensional model of the UV's environment and (ii) possible signal paths for each of the positioning signals. At least part of the possible signal paths include reflections of the positioning signals by one or more objects in the UV's environment. In other words, at least some of the possible signal paths are signal paths reproducing the reflection of the positioning signals by one or more objects in the UV's environment. The three-dimensional model of the UV's environment comprises information about at least a position, an orientation and a shape of objects in the UV's environment.

By estimating the position of the UV based on the three-dimensional model of the UV's environment and possible signal paths reproducing the reflection of the positioning signals, also the information provided by reflected positioning signals may be used for determining the position of the UV. By varying the UV's current position (or an estimate therefore) and taking into account the three-dimensional model of the UV's environment as well as the a priori known positions of the satellites, the possible signal paths for each of the positioning signals may be determined (e.g. using a probabilistic model). A respective most likely signal path among the possible signal paths for each of the positioning signals may be determined based on the positioning signals (or information derived therefrom/related thereto). Therefore, also the UV's distance to a satellite whose positioning signal arrives at the UV via one or more reflections may be determined correctly (or at least with higher accuracy compared to conventional approaches). Compared to conventional approaches, also reflected positioning signals may, hence, be used for accurate position determination. Therefore, all received positioning signals may be used for the position determination. For example, the positioning signals 231-1, 231-2 and 231-3 may all be used for position determination of the UAV 200 according to the proposed technique.

Figure 3:
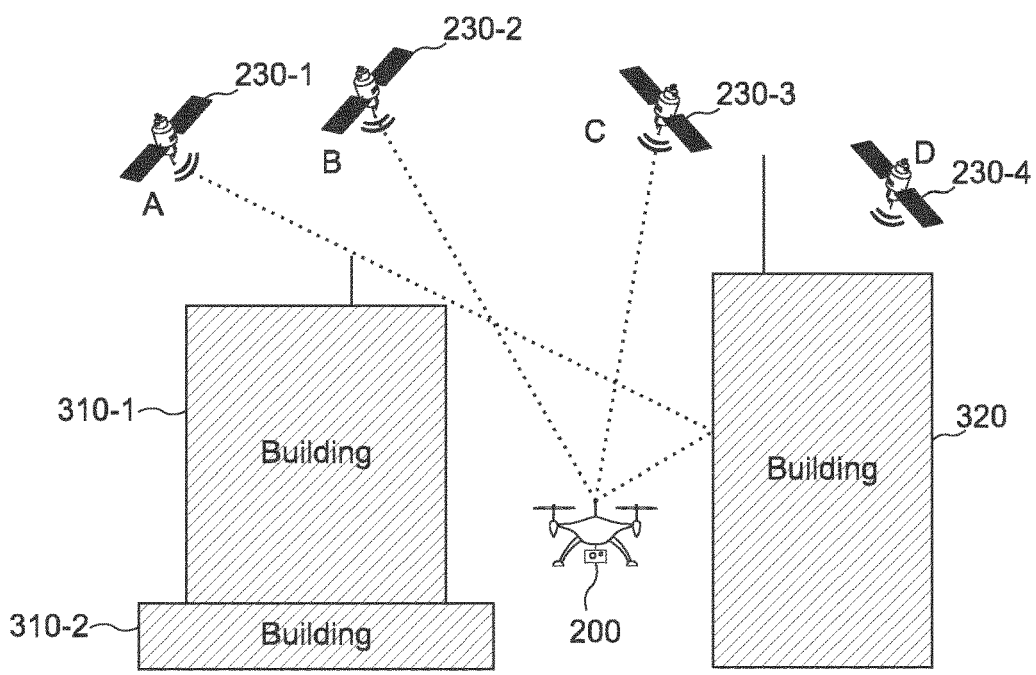
FIG. 3 illustrates an example of a two-dimensional representation of a three-dimensional model of the UAV's environment.

A two-dimensional representation of an exemplary three-dimensional model of the scenery depicted in FIG. 2 is illustrated in FIG. 3. As can be seen from FIG. 3, the geometries of the buildings 210 and 220 present in the real world are modelled by the objects 310-1, 310-2 and 320 in the three-dimensional model of the UAV 200's environment. Further, the objects 310 and 320 are semantically labelled. The objects 310-1, 310-2 and 320 are labelled as buildings.

Labelling the objects in the three-dimensional model of the UAV 200's environment may allow to predict the influence of the objects (structures) on the positioning signals of the satellites 230-1, . . . , 230-4 of the GNSS. As indicated in FIG. 1, the objects may be semantically labelled with information about a material class of the respective object (e.g. materials suitable for buildings, glass, concrete, steel, stone, rock, etc.). Alternatively or additionally, the objects may be semantically labelled with information about radio frequency properties of the respective object (e.g. radio frequency reflectivity, radio frequency absorption, etc.).

In the example of FIG. 3, the three-dimensional model of the UAV 200's environment comprises only static objects for modelling the buildings 210 and 220. In other examples, the three-dimensional model of the UV's environment may comprise at least one moving (dynamic) object for modelling a dynamic (moving) object in the real world such as a car. For example, a car moving the UV's environment may reflect a positioning signal (e.g. a GPS signal) in different directions over time and further influence its Doppler shift. A semantical model of the UV's environment that includes one or more dynamic objects (e.g. modelling geometry, pose, material properties and velocities) may allow to predict the influence of the moving car such that the positon estimation of the UV may be further improved. In other words, some implementations may consider the effect of dynamically moving objects.

As indicated in FIG. 1, the method 100 may further comprise determining 106 the three-dimensional model of the UV's environment based on sensor data of one or more sensors of the UV. For example, determining 106 the three-dimensional model of the UV's environment and estimating 104 the position of the UV may be performed simultaneously. In some examples, the one or more sensors of the UV comprise at least an optical sensor (e.g. a still camera or a moving picture camera) and an Inertial Measurement Unit (IMU). Optionally or alternatively, the one or more sensors of the UV may comprise other sensors such as one or more of, e.g., a magnetometer, a barometer, a radar sensor and a LiDAR sensor.

Figure 4:
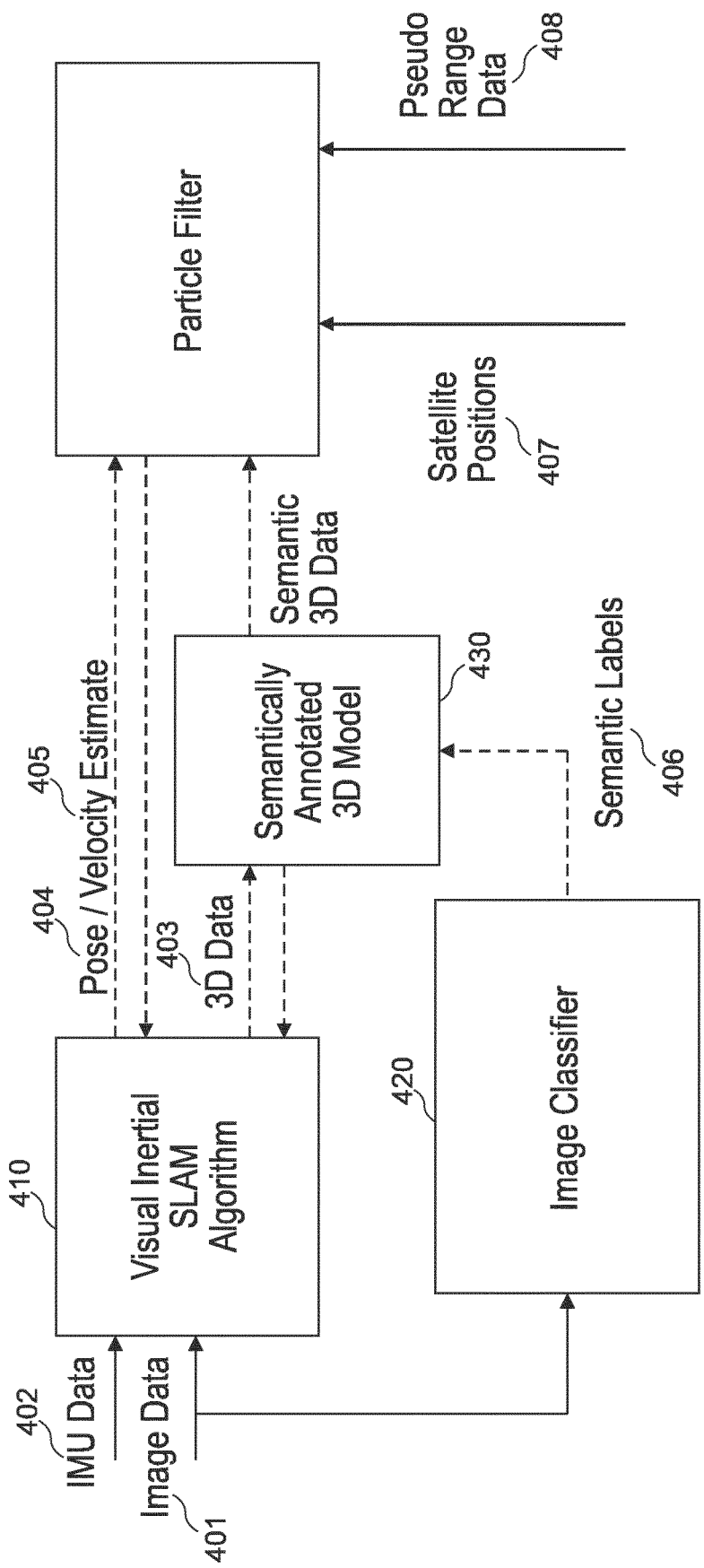
FIG. 4 illustrates an example of an architecture for estimating a position of the UV.

An example of an architecture for estimating 104 the position of the UV (e.g. the UAV 200) simultaneously to determining 106 the three-dimensional model of the UV's environment is illustrated in FIG. 4.

A Simultaneous Localization And Mapping, SLAM, algorithm 410 is used for determining, based on the sensor data 401, 402 of the optical sensor and the IMU, a three-dimensional representation of the UV's environment. Optionally, sensor data from further sensors (e.g. barometer, radar sensor, etc.) may be provided to the SLAM algorithm for determining the three-dimensional representation of the UV's environment. In addition to the three-dimensional representation of the UV's environment, the SLAM algorithm determines a pose estimate 404 and a velocity estimate 405 for the UV.

Further, an image classifying algorithm 420 is used for classifying at least one object of the UV's environment which is represented by the sensor data 401 of the optical sensor into one of a plurality of predefined categories. For determining the category of the object, the sensor data 401 is evaluated by the image classifying algorithm 420. That is, classifying, the at least one object of the UV's environment is based on the sensor data 401 of the optical sensor. For example, unsupervised, semi-supervised or supervised classification (e.g. using convolutional neural networks) may be used for image classification. The output of the image classifying algorithm 420 are semantic labels 406 for the objects in the three-dimensional representation 403 of the UV's environment which denote the respective classified category. As described above, the predefined categories may be radio frequency properties and/or material classes.

The at least one object in the three-dimensional representation of the UV's environment is semantically labelled with the classified category in order to obtain the three-dimensional model of the UV's environment 430.

The SLAM algorithm 410 is used together with a particle filter 440 representing a probabilistic model for possible signal paths for each of the positioning signals received from the satellites of the GNSS. The particle filter 440 receives the pose estimate 404 and the velocity estimate 405 for the UV from the SLAM algorithm 410, the three-dimensional model 430 of the UV's environment, the positions 407 of the satellites and information 408 related to the positioning signals as input. The positions 407 of the satellites are a priori known. The information 408 related to the positioning signals may, e.g., the positioning signals itself or a quantity derived therefrom (e.g. an arrival time at the UV, a propagation time from the satellite to the UV, etc.).

The particle filter 440 is used for determining a respective most likely signal path among the possible signal paths for each of the positioning signals. The particle filter 440 may be understood as a probabilistic model that includes the possibility of positioning signals being reflected in various ways or not being reflected at all. Based on the pose estimate 404 and the velocity estimate 405 for the UV, the respective most likely signal path among the possible signal paths for each of the positioning signals may be determined by the particle filter using the three-dimensional model 430 of the UV's environment, the positions 407 of the satellites and the information 408 related to the positioning signals. In other words, the path of a reflected positioning signal may be estimated by means of the particle filter 440. Hence, the particle filter 440 allows to maximize the posterior probability of the current pose estimate for the UV.

The output of the particle filter 440 is used by the SLAM algorithm 410 for updating the pose estimate and the velocity estimate. In other words, the pose estimate 404 and the velocity estimate 405 of the SLAM algorithm 410 are updated based on the respective most likely signal path among the possible signal paths for each of the positioning signals. The position indicated by the updated pose estimate of the SLAM algorithm 410 is determined as position of the UV.

Further the three-dimensional model 430 of the UV's environment is updated based on the updated pose estimate and the updated velocity estimate of the SLAM algorithm 410.

The data exchanged via the dashed in lines in the example of FIG. 4 may comprise uncertainty information.

The architecture illustrated in FIG. 4 may allow to estimate the position of the UV, and the geometry and properties of the UV's environment simultaneously with the paths of the positioning signals from the satellites (with known positions).

The proposed technique may allow to combine information from all available (i.e. received) positioning signals via a semantically annotated, globally referenced model of the UV's environment. As described above, the model of the UV's environment may be obtained by SLAM in combination with a semantic classification of image data. Using the (a priori known) positions of the satellites together with three-dimensional shape, position and orientation of obstacles (given by the model of the UV's environment) in the path of the positioning signals, even signals that arrive at the GNSS receiver of the UV via one or multiple reflections may provide information to increase the accuracy of the position information. The semantic information attached to the estimated geometry of the environment (given by the model of the UV's environment) may allow to predict the influence of objects (structures) on the positioning signals (e.g. whether an object will absorb or reflect the positioning signal).

The proposed technique may visually estimate the position, orientation, shape and material of (large) objects/structures in the environment of the UV to directly predict and take into account their influence on the positioning signals emitted by the satellites of the GNSS. Accordingly, the accuracy of the GNSS-based position estimation in environments with large structures such as large buildings in cities or large rocks in mountain areas may be improved.

Although a particle filter 440 is used in the example of FIG. 4, it is to be noted that in alternative examples another filter such as a Kalman filter or an expectation-maximization filter may be used.

Figure 5:
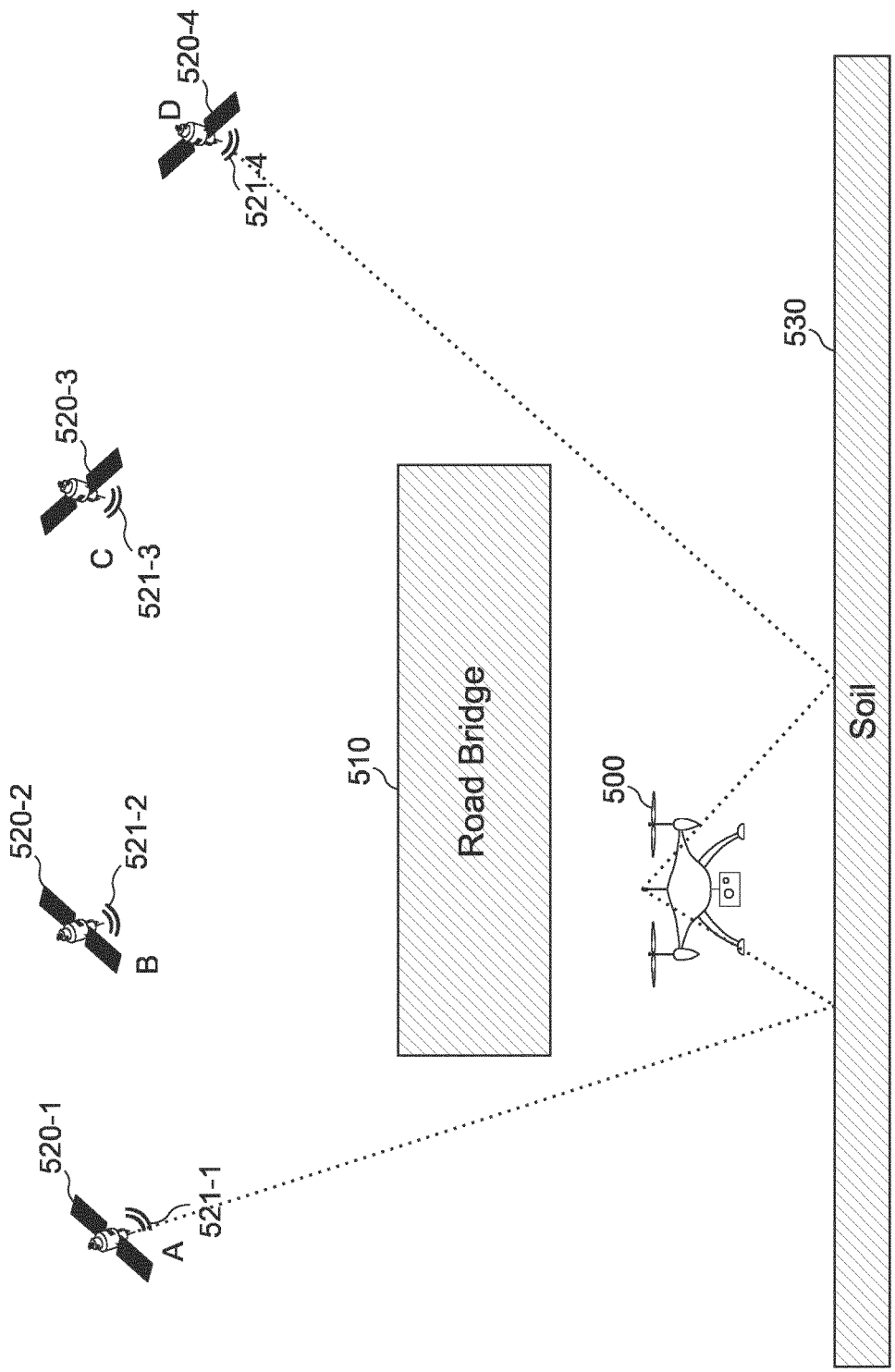
FIG. 5 illustrates another example of a UAV in an environment.

Compared to conventional approaches, the proposed technique allows to extract position and velocity information from positioning signals that have been reflected by objects/structures in the UV's environment. FIG. 5 illustrates an exemplary scenery in which an UAV 500 is flying under a road bridge 510. There is no direct line-of-sight to any of the four satellites 520-1, . . . , 520-4 of the GNSS. The positioning signals 521-2 and 521-3 of the satellites 520-2 and 520-3 are blocked by the road bridge 510. The positioning signals 521-1 and 521-4 of the satellites 520-1 and 520-4 are reflected by soil 530. In a situation such as the one illustrated in FIG. 5, the proposed technique enables to gain additional information from the positioning signals 521-1 and 521-4 to update the estimated position of the UAV 500. The semantically annotated three-dimensional model of the UAV 500's environment allows to predict the reflections of the positioning signals 521-1 and 521-4 such that the position can be accurately estimated from the positioning signals 521-1 and 521-4.

Figure 6:
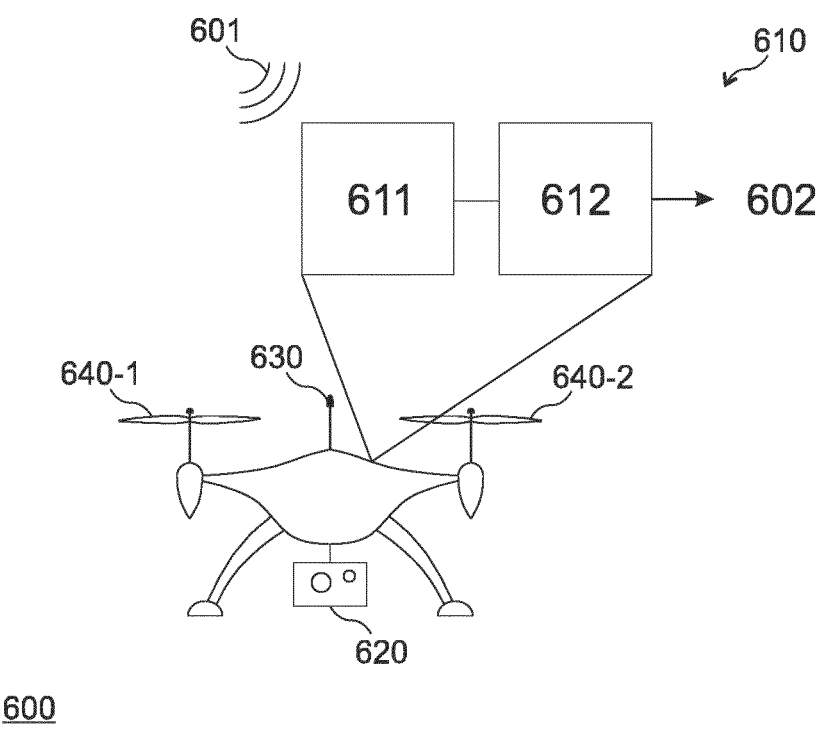
FIG. 6 illustrates an example of an UAV comprising an apparatus for determining a positon of the UAV.

An example of a UV using position determination according to the proposed technique is further illustrated in FIG. 6. In FIG. 6, the UV is an UAV 600 depicted as a multirotor drone (e.g. a quadcopter or a bi-copter) comprising a plurality of rotors 640-1, 640-2, . . . . However, it is to be noted that the UV is not limited thereto. In general, the UV may be any type of UGV or UAV such as, e.g., a mono-copter, a fixed-wing UAV (e.g. a plane or a Vertical Take-Off and Landing, VTOL, aircraft), or an autonomous car.

The UAV 600 comprises an apparatus 610 for determining a positon of the UAV 600. The apparatus 610 comprises a receiver circuit 611 coupled to a receive antenna 630 and configured to receive positioning signals 601 from a plurality of satellites of a GNSS (e.g. GPS). Further, the apparatus 610 comprises a processing circuit 612. For example, the processing circuit 612 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 612 may optionally be coupled to, e.g., read only memory (ROM) for storing software, random access memory (RAM) and/or nonvolatile memory. The apparatus 610 may further comprise other hardware—conventional and/or custom.

The processing circuit 612 receives data related to the received positioning signals 601 and optionally further data from one or more sensors of the UAV (e.g. an optical sensor 620 or an IMU). The processing circuit 612 processes the data according to the above described technique for determining the positon of the UAV 600.

The UAV 600 may further comprise other hardware—conventional and/or custom (e.g. an antenna for receiving control signals of a remote control).

The following examples pertain to further embodiments:

(1) A method for determining a position of a UV. The method comprises receiving positioning signals from a plurality of satellites of a global navigation satellite system. Further, the method comprises estimating the position of the UV based on (i) a three-dimensional model of the UV's environment and (ii) possible signal paths for each of the positioning signals. At least part of the possible signal paths include reflections of the positioning signals by one or more objects in the UV's environment.

(2) The method of (1), wherein objects in the three-dimensional model of the UV's environment are semantically labelled with information about radio frequency properties and/or a material class of the respective object.

(3) The method of (1) or (2), wherein the three-dimensional model of the UV's environment comprises only static objects.

(4) The method of (1) or (2), wherein the three-dimensional model of the UV's environment comprises at least one moving object.

(5) The method of any of (1) to (4), wherein the method further comprises determining the three-dimensional model of the UV's environment based on sensor data of one or more sensors of the UV.

(6) The method of (5), wherein the one or more sensors of the UV comprise at least an optical sensor and an inertial measurement unit.

(7) The method of (6), wherein determining the three-dimensional model of the UV's environment comprises: determining, based on the sensor data of the optical sensor and the inertial measurement unit, a three-dimensional representation of the UV's environment using a SLAM algorithm; classifying, based on the sensor data of the optical sensor, at least one object of the UV's environment which is represented by the sensor data of the optical sensor into one of a plurality of predefined categories; and semantically labelling the at least one object in the three-dimensional representation of the UV's environment with the classified category in order to obtain the three-dimensional model of the UV's environment.

(8) The method of (7), wherein the predefined categories are radio frequency properties and/or material classes.

(9) The method of (7) or (8), wherein the possible signal paths for each of the positioning signals are represented by a particle filter, and wherein the method comprises determining a respective most likely signal path among the possible signal paths for each of the positioning signals using the particle filter.

(10) The method of (9), wherein the particle filter receives a pose estimate and a velocity estimate for the UV from the SLAM algorithm, the three-dimensional model of the UV's environment, the positions of the satellites and information related to the positioning signals as input.

(11) The method of (9) or (10), wherein the method further comprises updating the pose estimate and the velocity estimate of the SLAM algorithm based on the respective most likely signal path among the possible signal paths for each of the positioning signals.

(12) The method of (11), wherein estimating the position of the UV comprises determining the position indicated by the updated pose estimate of the SLAM algorithm as position of the UV.

(13) The method of (11) or (12), wherein the method further comprises updating the three-dimensional model of the UV's environment based on the updated pose estimate and the updated velocity estimate of the SLAM algorithm.

(14) The method of any of (1) to (13), wherein the method is performed by the UV.

(15) The method of any of (1) to (14), wherein the UV is a UAV.

(16) The method of (15), wherein the UAV is a multirotor drone.

(17) A non-transitory machine readable medium having stored thereon a program having a program code for controlling a UV to perform the method for determining a positon of the UV according to any of (1) to (16), when the program is executed on a processor or a programmable hardware of the UV.

(18) An apparatus for determining a positon of a UV. The apparatus comprises a receiver circuit configured to receive positioning signals from a plurality of satellites of a global navigation satellite system. Further, the apparatus comprises a processing circuit configured to estimate the position of the UV based on (i) a three-dimensional model of the UV's environment and (ii) possible signal paths for each of the positioning signals, wherein at least part of the possible signal paths for each of the positioning signals include reflections of the positioning signals by one or more objects in the UV's environment.

(19) An UAV comprising an apparatus for determining a positon of the UAV according to (18).

(20) The UAV of (19), wherein the UAV is a multirotor drone.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining a position of an Unmanned Vehicle, UV, the method comprising:
   receiving positioning signals from a plurality of satellites of a global navigation satellite system;
   determining a three-dimensional model of a UV's environment based on sensor data of one or more sensors of the UV, wherein the one or more sensors of the UV include at least an optical sensor and an inertial measurement unit;
   determining, based on the sensor data of the optical sensor and the inertial measurement unit, a three-dimensional representation of the UV's environment using a Simultaneous Localization And Mapping, SLAM, algorithm;
   classifying, based on the sensor data of the optical sensor, at least one object of the UV's environment which is represented by the sensor data of the optical sensor into one of a plurality of predefined categories, wherein the predefined categories are radio frequency properties and/or material classes;
   semantically labelling the at least one object in the three-dimensional representation of the UV's environment with the classified category in order to obtain the three-dimensional model of the UV's environment;
   estimating the position of the UV based on (i) the three-dimensional model of the UV's environment and (ii) possible signal paths for each of the positioning signals, wherein at least part of the possible signal paths include reflections of the positioning signals by one or more objects in the UV's environment, wherein the possible signal paths for each of the positioning signals are represented by a particle filter, wherein the particle filter receives a pose estimate and a velocity estimate for the UV from the SLAM algorithm, the three-dimensional model of the UV's environment, the positions of the satellites and information related to the positioning signals as input; and
   determining a respective most likely signal path among the possible signal paths for each of the positioning signals using the particle filter.

2. The method of claim 1, wherein objects in the three-dimensional model of the UV's environment are semantically labelled with information about radio frequency properties and/or a material class of the respective object.

3. The method of claim 1, wherein the three-dimensional model of the UV's environment comprises only static objects.

4. The method of claim 1, wherein the three-dimensional model of the UV's environment comprises at least one moving object.

5. The method of claim 1, wherein the method further comprises updating the pose estimate and the velocity estimate of the SLAM algorithm based on the respective most likely signal path among the possible signal paths for each of the positioning signals.

6. The method of claim 5, wherein estimating the position of the UV comprises determining the position indicated by the updated pose estimate of the SLAM algorithm as position of the UV.

7. The method of claim 5, wherein the method further comprises updating the three-dimensional model of the UV's environment based on the updated pose estimate and the updated velocity estimate of the SLAM algorithm.

8. The method of claim 1, wherein the method is performed by the UV.

9. The method of claim 1, wherein the UV is an Unmanned Aerial Vehicle, UAV.

10. The method of claim 9, wherein the UAV is a multirotor drone.

11. A non-transitory machine readable medium having stored thereon a program having a program code for controlling an unmanned vehicle to perform the method for determining a position of the unmanned vehicle according to claim 1, when the program is executed on a processor or a programmable hardware of the unmanned vehicle.

12. An apparatus for determining a positon of an Unmanned Vehicle, UV, the apparatus comprising:
a receiver circuit configured to receive positioning signals from a plurality of satellites of a global navigation satellite system; and
a processing circuit configured to
determine a three-dimensional model of a UV's environment based on sensor data of one or more sensors of the UV, wherein the one or more sensors of the UV include at least an optical sensor and an inertial measurement unit;
determine, based on the sensor data of the optical sensor and the inertial measurement unit, a three-dimensional representation of the UV's environment using a Simultaneous Localization And Mapping, SLAM, algorithm;
classify, based on the sensor data of the optical sensor, at least one object of the UV's environment which is represented by the sensor data of the optical sensor into one of a plurality of predefined categories, wherein the predefined categories are radio frequency properties and/or material classes;
semantically label the at least one object in the three-dimensional representation of the UV's environment with the classified category in order to obtain the three-dimensional model of the UV's environment,
estimate the position of the UV based on (i) a three-dimensional model of the UV's environment and (ii) possible signal paths for each of the positioning signals, wherein at least part of the possible signal paths for each of the positioning signals include reflections of the positioning signals by one or more objects in the UV's environment, wherein the possible signal paths for each of the positioning signals are represented by a particle filter, wherein the particle filter receives a pose estimate and a velocity estimate for the UV from the SLAM algorithm, the three-dimensional model of the UV's environment, the positions of the satellites and information related to the positioning signals as input, and
determine a respective most likely signal path among the possible signal paths for each of the positioning signals using the particle filter.

13. An unmanned aerial vehicle comprising an apparatus for determining a positon of the unmanned aerial vehicle according to claim 12.

14. The unmanned aerial vehicle of claim 13, wherein the unmanned aerial vehicle is a multirotor drone.

* * * * *